United States Patent [19]

Kishi et al.

[11] Patent Number: 4,510,568

[45] Date of Patent: Apr. 9, 1985

[54] GRAPHIC PROCESSING METHOD

[75] Inventors: Hajimu Kishi, Hino; Masaki Seki, Tokyo, both of Japan

[73] Assignee: Fanuc Ltd., Tokyo, Japan

[21] Appl. No.: 463,881

[22] PCT Filed: May 25, 1981

[86] PCT No.: PCT/JP82/00192

§ 371 Date: Jan. 25, 1983

§ 102(e) Date: Jan. 25, 1983

[87] PCT Pub. No.: WO82/04339

PCT Pub. Date: Dec. 9, 1982

[30] Foreign Application Priority Data

May 25, 1981 [JP] Japan .................................. 56-079045
May 29, 1981 [JP] Japan .................................. 56-082894

[51] Int. Cl.³ ............................................. G06F 15/20
[52] U.S. Cl. .................................... 364/300; 364/521
[58] Field of Search ................ 364/200, 300, 521, 900

[56] References Cited

U.S. PATENT DOCUMENTS

| 3,887,903 | 6/1975 | Martell | 364/200 |
| 3,906,197 | 9/1975 | Grover | 364/521 |
| 4,451,895 | 5/1984 | Sliwkowski | 364/521 |

FOREIGN PATENT DOCUMENTS 49-18547 2/1974 Japan .
49-42255 4/1974 Japan .

Primary Examiner—Raulfe B. Zache
Attorney, Agent, or Firm—Staas & Halsey

[57] ABSTRACT

A graphic processing method in which a processing unit of a graphic input device is constituted by a computer, and a plurality of processing programs are stored beforehand in a memory of a host device. A predetermined processing program in accordance with the graphic processing to be executed in the graphic input device is transferred from the host device to a rewritable memory of the graphic input device, and graphic processing is executed by the graphic input device on the basis of the transferred processing program.

4 Claims, 5 Drawing Figures

GRAPHIC PROCESSING METHOD

BACKGROUND OF THE INVENTION

This invention relates to a graphic processing method. More particularly, the invention relates to a graphic processing method in a system where a host computer is provided with an input of graphic data obtained by the execution of predetermined graphic processing, or in a system in which graphic data is received from a host computer, predetermined graphic processing is executed using the graphic data, and the obtained graphic is drawn.

Tablets and digitizers are widely known as graphic input devices for the entry of graphics into a computer. A graphic input device has the ability to sense coordinate values, specifically by sensing a position on a surface designated by, e.g., a stylus pen or cursor and entering the position into a host computer (host device) in the form of planar coordinate data (coordinates values in the XY plane, by way of example). Thus, a graphic input device senses, as point data, the coordinates of each point designated by a pen and sends a group of these items of point data to a host computer.

Thus, the data fed into the host computer in this fashion is point data and not graphic data indicative of straight lines and arcs. Even though the input data is point data, the data handled by the host computer is dealt with internally thereof not only as point data but also as straight lines (line segments), circles (circular arcs) or curves obtained by connecting these points, segments or arcs. The ultimate purpose of the host computer, moreover, is not to generate these straight lines, circles and curve data (graphic data) but to prepare an NC tape, create a three-dimensional curved surface or design mechanical parts on the basis of the generated graphic data, and to execute processing for attaining the particular purpose.

In the conventional arrangements, a host computer must be made to bear an extremely heavy load in order to take the step of entering point data into the host computer, generating graphic data from the point data and then executing processing for the final objective on the basis of these items of graphic data.

Accordingly, a method has been proposed wherein a graphic input device is provided with an intelligence function so that graphic data may be generated from point data by the graphic input device and sent to the host computer. Specifically, the method involves constructing the control and processing units of the graphic input device from a microcomputer or the like and executing the processing for graphic data creation on the terminal side. With a graphic input device having the above-described intelligence function, however, it is possible to execute only specific processing that is based on the program stored in the read-only memory (ROM) incorporated within the device. In other words, the graphic input device cannot be made to perform processing other than that specified. For instance, though the input device may have the ability to generate graphic data (line segments, circular arcs, curve data) from point data, the device cannot recognize characters from point data and transmit the characters to the host computer, cannot recognize alpha-numerics written by a pen and transmit the alphanumerics to the host computer, cannot attach the sense of circular arcs and straight lines or other optional functions to the above-mentioned graphic data, and cannot create various data in accordance with the processing objective of the host computer. If it is attempted to force these functions upon the graphic input device, then it will be necessary to either replace the present ROM with a ROM for storing the desired processing program, or provide a ROM of large capacity, store various processing programs in the ROM and execute processing upon selecting the ROM prescribed for the particular objective. The former expedient is undesirable, however, because replacing the ROM is a troublesome task and ROMs storing the various processing programs must be prepared beforehand. The latter expedient entails a ROM of large capacity and raises cost. Overall system costs become particularly high in cases where a number of the input devices are connected to the host computer.

What has been set forth above regarding graphic input systems also applies to graphic output systems. Plotters and drafters are well-known as graphic output devices for preparing drawings based on graphic data produced at the output of a host computer. These graphic output devices continuously receive, e.g., pen positional data from the host computer and cause the pen to move on the basis of the positional data to produce a graphic. For example, in the case of a plotter, a curve which is desired to be written is converted by the host computer into a series of points on a predetermined plane, each item of point data for the various points obtained by the conversion is delivered to the plotter, and the plotter pen is transported on the basis of the point data to draw the curve in the form of an assemblage of points, as shown in FIG. 1. The conventional arrangement is undesirable, however, since the host computer is subjected to an increased burden owing to the construction which requires that the host computer convert the curve into the series of dots on the predetermined plane and then deliver the point data to the plotter.

Accordingly, the most common practice recently is to provide the output device with an intelligence function. An output device having an intelligence function is adapted to receive line segment or circular arc data from the host computer and perform interpolations based on the line segments or circular arcs to generate and draw curves composed of these segments and arcs. The control and processing units are constituted by a microcomputer or the like, so that the output device has the contruction of a computer. Thus a graphic output device has a ROM in which a predetermined graphic processing program is stored in advance, and is adapted to draw by performing graphic processing in accordance with the graphic processing program. Even though the graphic output device is provided with the intelligence function, however, the host computer must still generate the line segment data or circular arc data on the predetermined plane, so that the desired effect of lightening the burden is insufficient, though the burden is not as heavy as in the case where the data indicative of a series of points is generated. With a graphic output device having the above-described intelligence function, however, it is possible to execute only processing that is in accordance with the program stored in the ROM. In other words, the graphic output device either cannot be made to perform graphic processing other than that specified, or increases the load on the host computer. For instance, though the output device may have the ability to receive two-dimensional line segment data or circular arc data as an input thereto and draw curves on a predetermined plane, it cannot receive three-dimensional data and draw three-dimensional graphics (perspective views), as shown in FIGS. 2A and 2B, based on the three-dimensional data, nor can it draw a curved projection, obtained by projecting a curve onto any predetermined plane. When it is attempted to force these functions upon the graphic output device, it is necessary to either replace the present ROM with a ROM for storing the desired processing program, or provide a ROM of large capacity, store various processing programs in the ROM and execute processing upon selecting the ROM prescribed for the particular objective. The former method is undesirable, however, because replacing the ROM is a troublesome task and ROMs storing the various graphic processing programs must be prepared beforehand. The latter method requires a ROM of large capacity and raises cost.

Accordingly, an object of the present invention is to provide an easily operable graphic processing method that is capable of lightening the load borne by the host computer, and that enables the functions of a graphic input device and graphic output device to be changed, in a simple manner without modifying hardware.

SUMMARY OF THE INVENTION

A graphic processing method for entering graphic data into a host computer from a graphic input device and executing predetermined processing based on the entered graphic data, or a graphic processing method for entering graphic data into a graphic output device from a host computer and drawing a graphic obtained by executing predetermined processing based on the entered graphic data. In such a graphic processing method, the processing unit of the graphic input device or graphic output device is constituted by a computer, and a plurality of processing programs are stored beforehand in a memory of the host computer. A predetermined processing program in accordance with the graphic processing to be executed in the graphic input device or graphic output device is transferred from the host computer to a rewritable memory of the graphic input device or graphic output device, and graphic processing is executed on the basis of the transferred processing program. According to the described graphic processing method, a graphic input device such as a tablet or digitizer or a graphic output device such as a plotter or drafter can be made to execute desired graphic processing merely by rewriting the graphic processing program of the graphic input or output device, without requiring modification of hardware. Furthermore, the function of a graphic input device and a graphic output device can be changed to conform to the overall system function merely by transmitting a predetermined processing program itself from the host computer to the terminal side. This enables the construction of a system fitted to the processing executed by the host computer.

DESCRIPTION OF PREFERRED EMBODIMENTS

An embodiment of the present invention will now be described in detail with reference to the drawings.

Figure 3:
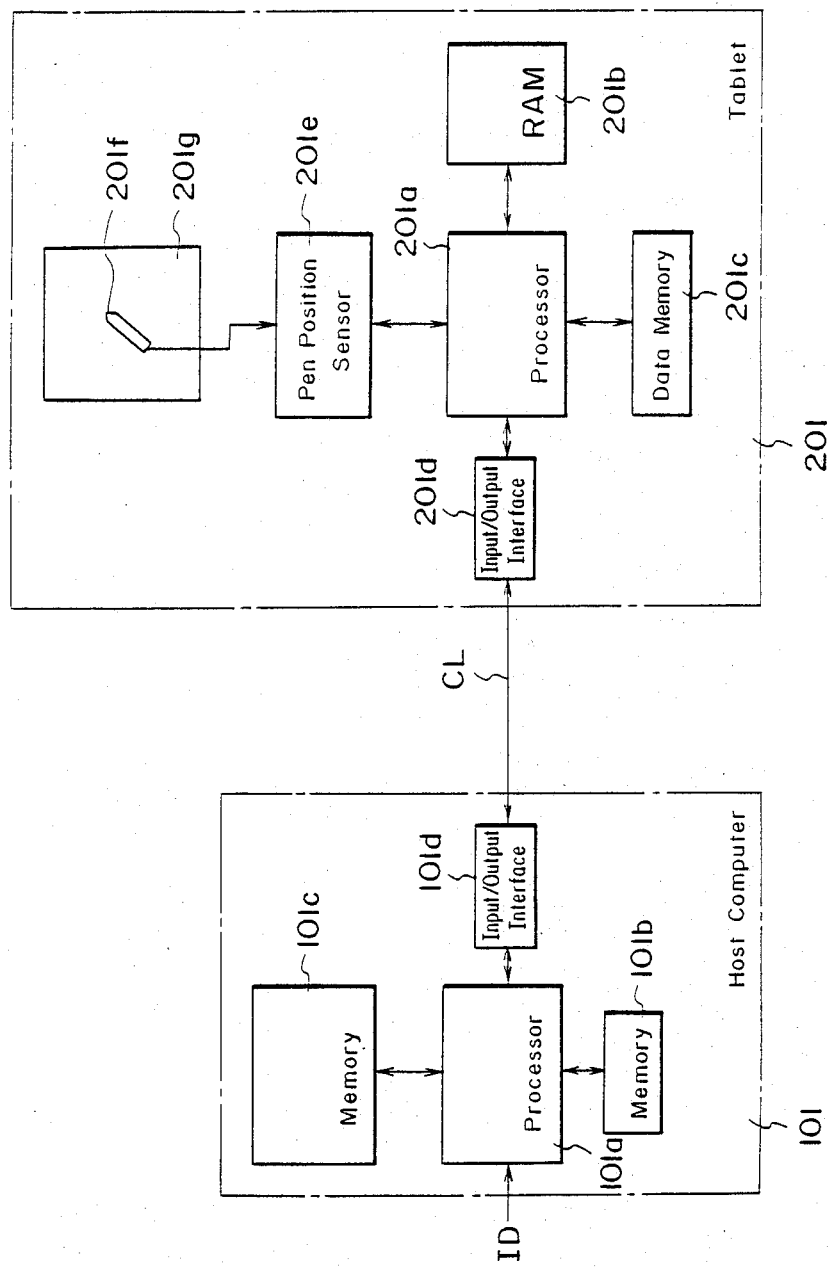
FIG. 3 is a block diagram embodying the present invention in a case where graphic data is entered into a host computer.

FIG. 3 is a block diagram embodying the present invention in a case where graphic data is entered into a host device. In FIG. 3, numeral 101 denotes a host computer (host device) having, e.g., a processor 101a, a memory 101b for storing a control program, a memory 101c for storing a plurality of processing programs, and an input/output interface 101d. The processor 101a executes predetermined processing based on the control program upon receiving a data input. The input/output interface 101d includes a buffer register of a predetermined capacity and a conversion circuit for converting data from serial to parallel form, or vice versa. Numeral 201 denotes a tablet which serves as a graphic input device, the processing unit of which is constituted by a computer and includes a processor 201a, a rewritable memory (RAM) 201b for storing a processing program, a data memory 201c for storing point data and the results of processing, an input/output interface 201d, a pen position sensor 201e, and a pen 201f. The input/output interfaces 101d, 201d are interconnected by a signal transmission line CL so as to be capable of transmission in both directions.

When a predetermined point on a board 201g is designated by a pen 210f, the coordinates of the point are sensed by the pen position sensor 201e and stored as point data in the data memory 201c. Assuming that the tablet 201 is provided with a function for creating graphic data, such as line segments and circular arcs on a predetermined plane, from the point data, and for delivering these items of graphic data to the host computer 101, a processing program for executing the processing necessary for such graphic data creation is stored in the memory 201b of the tablet 201. The processing program is stored in the memory 201b in the following manner. First, the tablet 201 feeds a code specifying said processing program as well as a transfer request signal into the host computer 101. The processor 101a responds by reading the processing program out of the memory 101c and transferring it successively to the buffer register in the input/output interface 201d through the input/output interface 101d and transmission line CL. Meanwhile, the processor 201a reads the processing program which has been transferred to and stored in the buffer register of the input/output interface 201d and writes the program into the memory 201b. Thus the processing program whose transfer has been requested is loaded from memory 101c into memory 201b by the aforementioned transfer and write processing.

With the predetermined processing program having been stored in the memory 201b of tablet 201, the pen 201f is operated to enter point data, whereupon the processor 201a, under the control of said processing program, creates graphic data by successively processing the point data, and enters the graphic data into the host computer 101. It should be noted that the graphic data will be starting and end point coordinate values for a straight line. For a circular arc the graphic data will be incremental values from the starting point to the end point of the circular arc, and from the starting point of the circular arc to the center thereof.

There are cases where it is desired to insert the sense of a line segment or circular arc and other kinds of data into the graphic data created by the tablet 201, or to change the function of the tablet in accordance with the processing performed by the host. In such cases the desired processing program is read out of the memory 101c of the host computer 101 and then transferred to and stored in the memory 201b of the tablet 201, just as described above.

Figure 4:
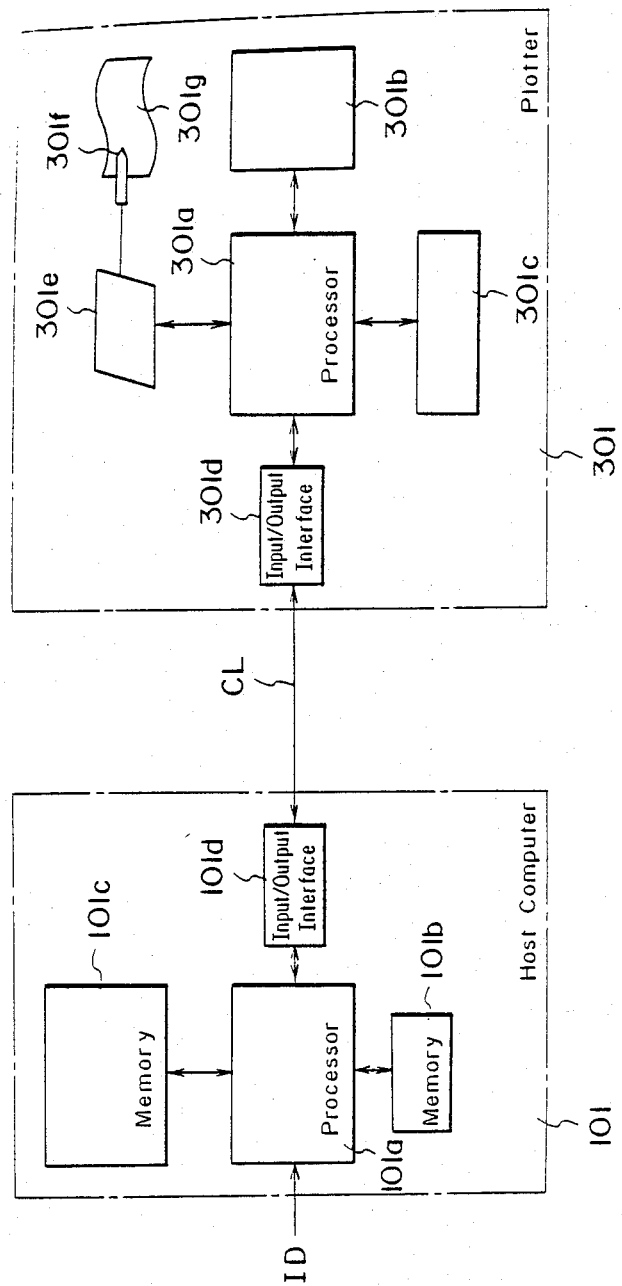
FIG. 4 is a block diagram embodying the present invention in a case where drawing is performed by executing graphic processing based on graphic data received from a host computer.

FIG. 4 is a block diagram of the present invention for drawing a graphic based on graphic data received from the host computer. Portions similar to those shown in FIG. 3 are designated by like reference characters. In FIG. 4, numeral 301 denotes a plotter which serves as a graphic output device, the processing unit of which is constituted by a computer and includes a processor 301a, a rewritable memory (RAM) 301b for storing a graphic processing program, a data memory 301c for storing graphic data produced as an output by the host computer 101 as well as the results of processing, an input/output interface 301d, a pen driver 301e, and a pen 301f. The input/output interfaces 101d, 301d are interconnected by a signal transmission line CL so as to be capable of transmission in both directions.

A desired graphic processing program is loaded into the memory 301b of the plotter 301 when it is desired to draw line segments and circular arcs on a recording paper 301g, thereby creating curves as a collection of these line segments and circular arcs, based on line segment and circular arc data of a predetermined plane, say the XY plane, which are successively delivered to the plotter 301. Specifically, the plotter 301 feeds a code specifying said graphic processing program as well as a transfer request signal into the host computer 101. The processor 101a responds by transferring the processing program to the buffer register in the input/output interface 301d through the input/output interface 101d and transmission line CL. Meanwhile, the processor 301a of the plotter 301 reads the graphic processing program which has been transferred to and stored in the buffer register of the input/output interface 301d and writes the program successively into the memory 301b. Thus the graphic processing program whose transfer has been requested is loaded from memory 101c into memory 301b by continuing the aforementioned transfer and write processing. Thenceforth, when graphic data indicative of line segments or circular arcs on the XY plane are similarly transferred from the host computer 101, the graphic data is written into the data memory 301c in the same way that processing was executed to write the graphic processing program into the memory 301b. Then, under the control of the graphic processing program stored in the memory 301b, the processor 301a successively reads the transferred and stored graphic data out of the data memory 301c, executes graphic processing and delivers the results of processing to the pen driver 301e, whereby the pen 301f is moved to draw on the recording paper.

Figure 1:
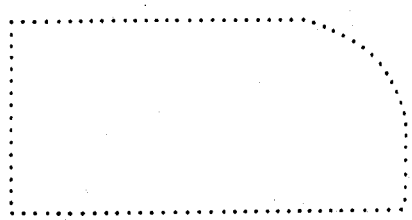
FIGS. 1, 2A and 2B are explanatory views for describing examples of drawings.
Figure 2A:
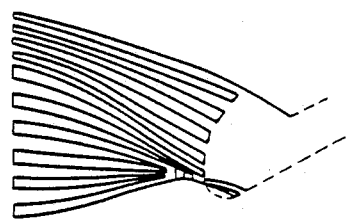
Figure 2B:
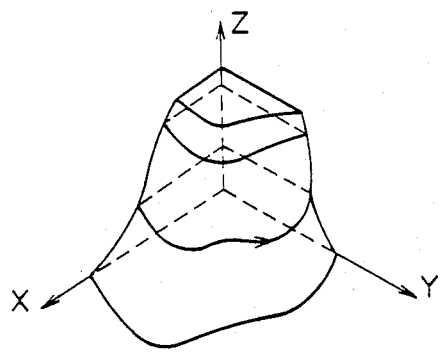

There are cases where it is desired that the host computer 101 deliver three-dimensional data to the plotter 301 so that a three-dimensional graphic may be drawn, as shown in FIGS. 2A and 2B, on the basis of the three-dimensional data. In such cases the graphic processing program for executing such graphic processing is selected from the memory 101c of the host computer 101 and loaded into the memory 301b of the plotter 301, just as described above.

Likewise, when it is desired to deliver three-dimensional data to the plotter 301 to have the plotter draw a curve on the recording paper which is a curve projected onto an arbitrary plane, the processing program for executing such graphic processing need only be read out of the memory 101c of host computer 101 and transferred for storage to the memory 301b of plotter 301.

Thus, by storing various graphic processing programs in the memory 101c of the host device 101 and transferring the desired graphic processing program to the memory 301b of the plotter 301 for storage there, the plotter can be made to execute the desired graphic processing without requiring any modification of hardware.

We claim:

1. A graphic processing method for entering data into a host computer from a graphic input device and executing predetermined processing based on the entered graphic data, in which a processing unit in the graphic input device for entering the graphic data into the host computer comprising a computer, said method is characterized by a first step of storing a plurality of processing programs in a memory of the host computer, a second step of requesting a predetermined processing program in accordance with graphic processing to be executed in the graphic input device, a third step of transferring the requested processing program from the host computer to a rewritable memory of the graphic input device, and a fourth step of executing graphic processing based on the transferred processing program and entering the obtained graphic data into the host computer.

2. A graphic processing method according to claim 1, said fourth step including a step of entering point data into the graphic input device, a step of converting said point data into graphic data indicative of line segments, circular arcs as well as curves composed of line segments and circular arcs, in accordance with a processing program stored in the rewritable memory of said graphic input device, and a step of entering this graphic data into the host computer.

3. A graphic processing method according to claim 2, including a step of defining sense by the point data input sequence, and employing said sense as a portion of the graphic data.

4. A graphic processing method for drawing a graphic obtained by executing predetermined graphic processing based on graphic data entered from a host computer, in which a processing unit in a graphic output device for drawing a graphic is constituted by a computer, said method comprising a first step of storing a plurality of processing programs in a memory of the host computer, a second step of requesting a desired graphic processing program in accordance with graphic processing to be executed, a third step of transferring the requested processing program from the host computer to a rewritable memory of the graphic output device, and a fourth step of executing graphic processing based on the transferred graphic processing program, thereby to draw a graphic.

* * * * *

UNITED STATES PATENT AND TRADEMARK OFFICE
CERTIFICATE OF CORRECTION

PATENT NO. : 4,510,568
DATED : Apr. 9, 1985
INVENTOR(S) : Hajimu Kishi et al

It is certified that error appears in the above-identified patent and that said Letters Patent is hereby corrected as shown below:

On the title page;

[73] "Ltd.," should be --Ltd,--.

Column 2, line 47, "contruction" should be --construction--.

Column 6, line 23, "comprising" should be --is constituted by--; delete "is char-";
line 24, "acterized by" should be --comprising--.

Signed and Sealed this

Seventeenth Day of September 1985

[SEAL]

Attest:

Attesting Officer

DONALD J. QUIGG

Commissioner of Patents and Trademarks—Designate